(12) United States Patent
Ishigaki et al.

(10) Patent No.: US 8,866,960 B2
(45) Date of Patent: Oct. 21, 2014

(54) IMAGING APPARATUS THAT ADJUSTS LIGHT EXPOSURE BY ANALYZING POLARIZATION COMPONENTS

(75) Inventors: Tomoko Ishigaki, Kanagawa (JP); Ryosuke Kasahara, Kanagawa (JP); Xue Li, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 13/587,204

(22) Filed: Aug. 16, 2012

(65) Prior Publication Data

US 2013/0050570 A1 Feb. 28, 2013

(30) Foreign Application Priority Data

Aug. 30, 2011 (JP) .................................. 2011-187084
Jul. 3, 2012 (JP) .................................. 2012-149029

(51) Int. Cl.
*H04N 5/235* (2006.01)
*G03B 7/00* (2014.01)
*H04N 5/228* (2006.01)
*B60R 1/00* (2006.01)

(52) U.S. Cl.
CPC ................ *B60R 1/00* (2013.01); *H04N 5/2351* (2013.01); *H04N 5/2353* (2013.01)
USPC ......................... 348/362; 348/222.1; 348/148

(58) Field of Classification Search
CPC .... H04N 7/181; B60R 2300/105; B60R 1/00; G03F 7/70566
USPC ................................ 348/148, 222.1, 362, 365
See application file for complete search history.

(56) References Cited

U.S. PATENT DOCUMENTS

| 2006/0165288 A1* | 7/2006 | Lee et al. ....................... 382/181 |
| 2008/0226147 A1* | 9/2008 | Hargrove et al. .............. 382/128 |
| 2009/0315993 A1* | 12/2009 | Hirai ............................... 348/148 |
| 2010/0231717 A1 | 9/2010 | Sasaki et al. |
| 2012/0147187 A1 | 6/2012 | Li et al. |
| 2012/0242835 A1* | 9/2012 | Li et al. .......................... 348/148 |
| 2013/0027557 A1* | 1/2013 | Hirai et al. ..................... 348/148 |

FOREIGN PATENT DOCUMENTS

| JP | 11-175702 | 7/1999 |
| JP | 2005-092857 | 4/2005 |
| JP | 2010-025915 | 2/2010 |
| JP | 2010-103810 | 5/2010 |

* cited by examiner

*Primary Examiner* — Tuan Ho
*Assistant Examiner* — Shahbaz Nazrul
(74) *Attorney, Agent, or Firm* — Oblon, Spivak, McClelland, Maier & Neustadt, L.L.P.

(57) ABSTRACT

An imaging apparatus, including an imaging device determining an index value representing differences in sizes of plural polarization components having polarization directions different from each other included in light from each point in an imaging area, and continuously image a polarization information image having a pixel value based on the determined index value to form a moving image of the polarization information image; and a light exposure adjuster adjusting a light exposure such that the differences in sizes of the plural polarization components are maximum at a predetermined light exposure adjustment time during the continuous imaging.

10 Claims, 7 Drawing Sheets

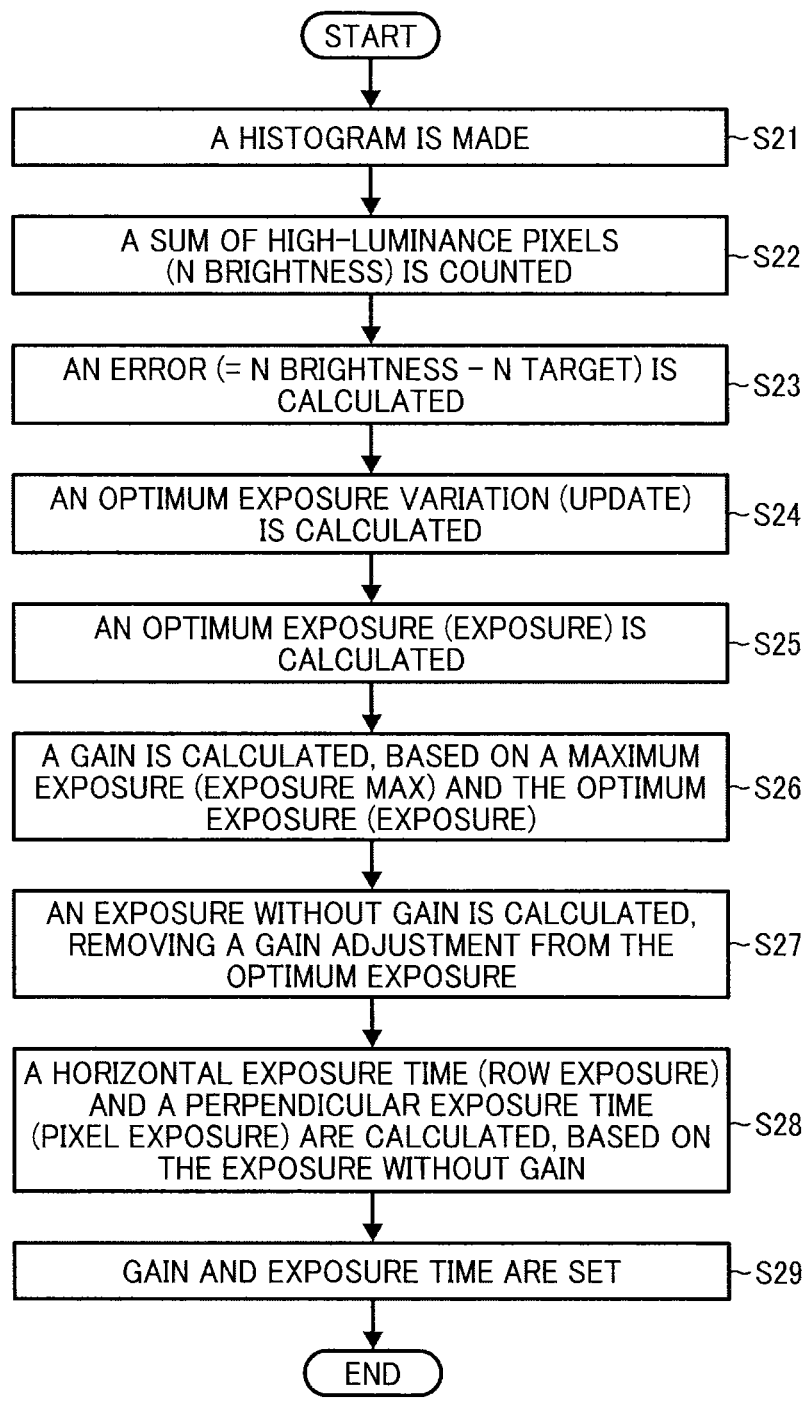

IMAGING APPARATUS THAT ADJUSTS LIGHT EXPOSURE BY ANALYZING POLARIZATION COMPONENTS

CROSS-REFERENCE TO RELATED APPLICATIONS

This patent application is based on and claims priority pursuant to 35 U.S.C. §119 to Japanese Patent Applications Nos. 2011-187084 and 2012-149029, filed on Aug. 30, 2011 and Jul. 3, 2012, respectively, in the Japanese Patent Office, the entire disclosure of which is hereby incorporated herein by reference.

FIELD OF THE INVENTION

The present invention relates to an imaging apparatus determining an index value representing differences in sizes of polarization components having polarization directions different from each other included in light from each point in the imaging area and imaging a polarization information image having a pixel value based on each of the determined index value, and to an image analyzer and a moving apparatus using the imaging apparatus.

BACKGROUND OF THE INVENTION

The imaging apparatus is widely used in identification processes, e.g., moving body controllers controlling moving bodies (moving apparatuses) such as vehicles, vessels, aircrafts and industrial robots and information providers providing useful information to drivers of the moving bodies. Specifically, the imaging apparatus used in driver support system such as ACC (Adaptive Cruise Control) reducing drive load of vehicle drivers is known. The vehicle drive support system includes various functions such as an automatic braking system and a warning system preventing a vehicle from crashing into obstacles and reducing an impact of crashing, an automatic velocity controller for keeping a distance with a vehicle ahead, and an assisting system to prevent a vehicle from veering out of its lane. For these purposes, it is essential to obtain various environmental information around a vehicle as accurately as possible by analyzing images around the vehicle. The environmental information around a vehicle includes positional information of various objects, e.g., obstacles present around the vehicle, other vehicles, traffic lanes such as white lines and Botts Dots, road surface compositions such as manhole covers, road edge structures such as guard rails; road surface wet-dry information; and sunlight information informing sunny or shady, etc.

A typical imaging apparatus detects light intensity (luminance information) and forms an image according to the luminance information. However, an imaging apparatus capable of forming an image (polarization information image) reflecting polarization information for detection (sensing) of a shape, a material, a surface status, etc. of an object present in an imaging area has been attracting attention recently. The imaging apparatus uses reflection light (specular reflection light or diffuse reflection light) from an object irradiated with a particularly polarized light or non-polarized natural light, which is various partially-polarized light according to geometric elements such as a direction of the surface of the object and an imaging position relative thereto, and the surface material thereof. The imaging apparatus is capable of obtaining a two-dimensional distribution of plural polarization components having polarization directions different from each other included in the reflection light from the object in the imaging area. Comparing with the differences among the polarization components included in the light from the object in the imaging area, the positional information of the object, the road surface wet-dry information, the sunlight information, etc. can more accurately be obtained.

Japanese published unexamined application No. 11-175702 discloses an imaging apparatus parallely locating an imaging element imaging through a polarization filter transmitting only a perpendicular polarization component and an imaging element imaging through a polarization filter transmitting only a horizontal polarization component. In the imaging apparatus, the former imaging element produces an image signal of a perpendicular polarization image representing a two-dimensional intensity distribution of the perpendicular polarization component included in the reflection light from the object in the imaging area, and the latter imaging element produces an image signal of a horizontal polarization image representing a two-dimensional intensity distribution of the horizontal polarization component included in the reflection light from the object in the imaging area. The imaging apparatus corrects a parallax positional gap of the image signals of the perpendicular polarization image and the horizontal polarization image, and determines a ratio of a perpendicular polarization intensity to a horizontal polarization intensity per a pixel to obtain a polarization ratio image (polarization information image) having a pixel value which is the polarization ratio.

Analyzing the polarization ratio image imaged by the imaging apparatus disclosed in Japanese published unexamined application No. 11-175702 enables it to obtain the above-mentioned various information such as positional information of the object. Not only the polarization ratio image imaged, but also the polarization information image having a pixel value based on an index value representing differences in sizes of polarization components included in light from each point in the imaging area, e.g., a difference value among these polarization components and a ratio thereof to a total value of these polarization components does as well.

An inaccurate index value is determined when even one of the polarization components used for determining the index value received by a light receiving element has a saturated amount of light received which is a maximum value of a light quantity detection range. When the polarization information image including the inaccurate index values is analyzed, the analysis results have errors and it is difficult to obtain accuracy of the above-mentioned various information. In order to avoid this, imaging at sufficiently low light exposure such that the light receiving element does not have a saturated value of the amount of light received is recommended. However, any of the polarization components has a low amount of light received, and the index value representing differences in sizes of the polarization components has a narrow range. As a result, the polarization information image having a pixel value based on an index value has a low contrast, resulting in inaccurate analysis thereof.

Because of these reasons, a need exist for an imaging apparatus capable of accurately analyzing a polarization information image having a pixel value based on an index value representing differences in sizes of polarized components included in light from each point in an imaging area.

SUMMARY OF THE INVENTION

Accordingly, one object of the present invention to provide an imaging apparatus capable of accurately analyzing a polarization information image having a pixel value based on an index value representing differences in sizes of polarized components included in light from each point in an imaging area.

Another object of the present invention to provide an image analyzer using the imaging apparatus.

These objects and other objects of the present invention, either individually or collectively, have been satisfied by the discovery of an imaging apparatus, comprising:

an imaging device configured to determine an index value representing differences in sizes of plural polarization components having polarization directions different from each other included in light from each point in an imaging area, and continuously image a polarization information image having a pixel value based on the determined index value to form a moving image of the polarization information image; and a light exposure adjuster configured to adjust a light exposure such that the differences in sizes of the plural polarization components are maximum at a predetermined light exposure adjustment time during the continuous imaging.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 9 is a flowchart showing a process of another exposure control.

DETAILED DESCRIPTION OF THE INVENTION

The present invention provides an imaging apparatus capable of accurately analyzing a polarization information image having a pixel value based on an index value representing differences in sizes of polarized components included in light from each point in an imaging area.

More particularly, the present invention relates to an imaging apparatus, comprising:

an imaging device configured to determine an index value representing differences in sizes of plural polarization components having polarization directions different from each other included in light from each point in an imaging area, and continuously image a polarization information image having a pixel value based on the determined index value to form a moving image of the polarization information image; and a light exposure adjuster configured to adjust a light exposure such that the differences in sizes of the plural polarization components are maximum at a predetermined light exposure adjustment time during the continuous imaging.

An embodiment of the imaging apparatus of the present invention used for car-mounted equipment control system is explained.

Figure 1:
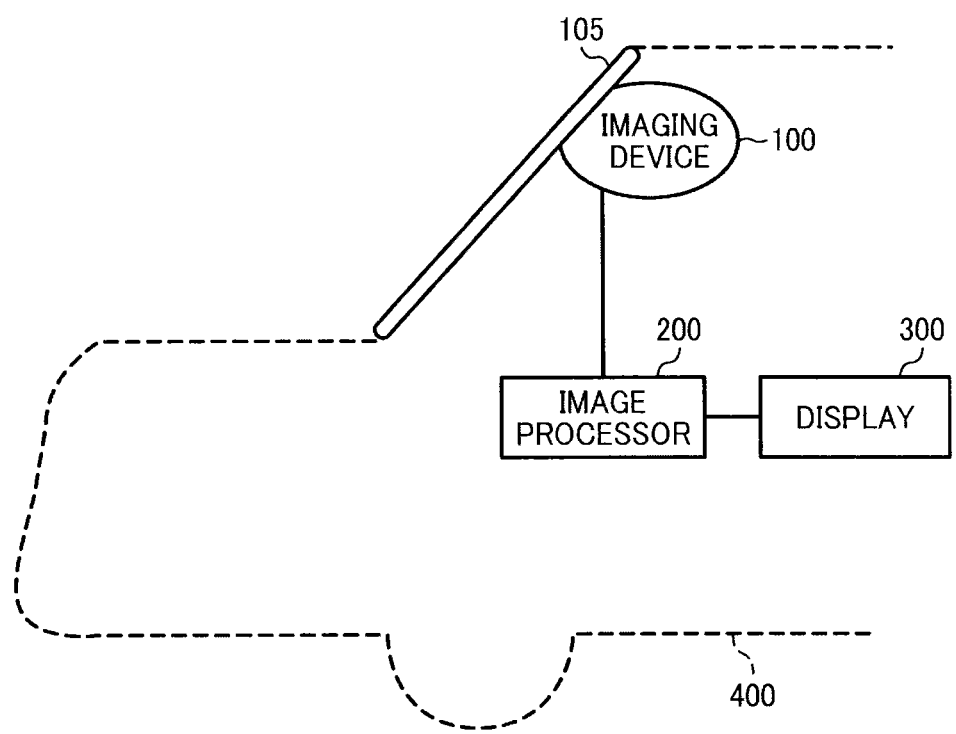
FIG. 1 is a schematic view illustrating a whole imaging car-mounted equipment control system in the present invention.

FIG. 1 is a schematic view illustrating a whole imaging car-mounted equipment control system in the present invention.

Figure 2:
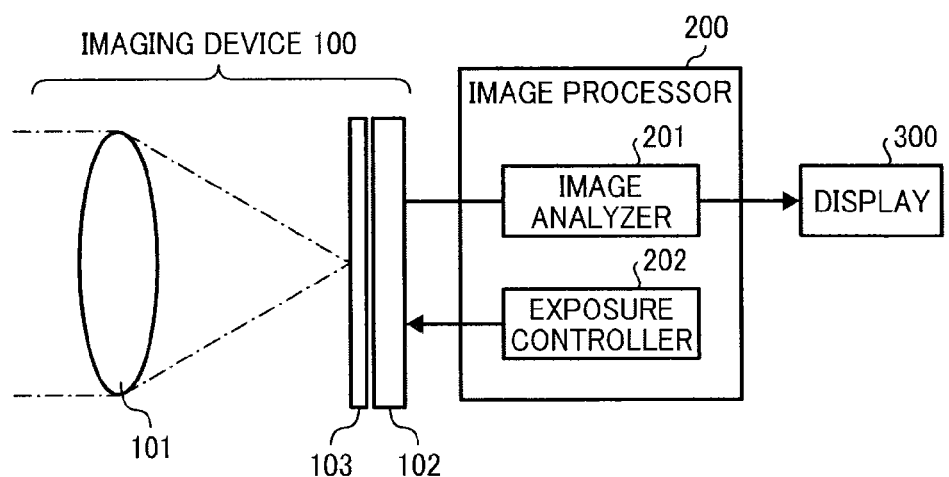
FIG. 2 is a schematic view illustrating an imaging car-mounted equipment control system in the present invention.

FIG. 2 is a schematic view illustrating an imaging car-mounted equipment control system in the present invention.

The car-mounted equipment control system images an image of a frontal area in a travel direction (imaging area) with an imaging device 100 mounted in a moving apparatus such as a vehicle 400, analyzes the image with an image processor 200 to detect a position of an object in the imaging area, and displays the detection result on a display 300 to provide useful information (car-drive assisting information) to a driver. The imaging apparatus in the car-mounted equipment control system mainly includes the imaging device 100, the image processor 200 and the display 300.

The imaging device 100 is. e.g., located near a room mirror on a front glass 105 of the vehicle 400 and images frontal area in a travel direction thereof as an imaging area. The imaging device 100 mainly includes an optical system 101 such as imaging lenses, a polarization filter 103 as an optical filter and an image sensor 102 formed of a pixel array on which a light receiving element is two-dimensionally located.

Figure 3:
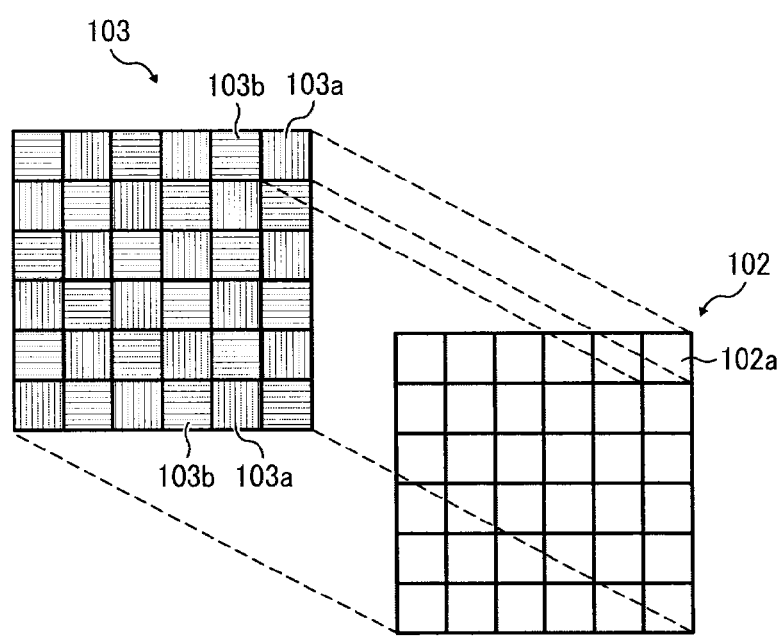
FIG. 3 is an explanatory view of a polarization filter for use in the present invention.

FIG. 3 is an explanatory view of a polarization filter for use in the present invention.

The polarization filter 103 of the present invention includes a perpendicular polarization area (first area) 103a selectively transmitting only a perpendicular polarization component oscillating in parallel with a longitudinal direction of a light receiving element 102a of the image sensor 102 and a perpendicular polarization area (second area) 103b selectively transmitting only a horizontal polarization component oscillating in parallel with a horizontal direction of the light receiving element 102a of the image sensor 102, which are located in a checkerboard pattern so as to alternately be adjacent to each other in a two-dimensional direction. Each area of the polarization filter 103 corresponds to the light receiving element 102a (unit area) on the image sensor 102.

The polarization filter 103 of the present invention may include a polarization area (first area) selectively transmitting only a perpendicular polarization component or a horizontal polarization component and a non-polarization area (second area) transmitting non-polarization light without selecting a polarization component. In this case, one of the perpendicular polarization component or the horizontal polarization component is directly obtained from an amount of light received by the light receiving element 102a receiving light transmitted through the polarization area. From an amount of light received by the light receiving element 102a receiving light transmitted through the non-polarization area, an amount of light received by the light receiving element 102a receiving light transmitted through a polarization area adjacent to the non-polarization area is reduced to assume the other polarization component.

A light receiving element opposed to the perpendicular polarization area of the polarization filter 103 receives the perpendicular polarization component to produce a signal according to an amount of the light received, and a light receiving element opposed to the horizontal polarization area of the polarization filter 103 receives the horizontal polarization component to produce a signal according to an amount of the light received. Therefore, the present invention can obtain polarization image date of the perpendicular and horizontal polarization components at one imaging operation. Based on the signal produced from the light receiving element 102a, the image sensor 102 transmits a digital signal value according to an amount of light received by the light receiving element 102a as unprocessed original polarization RAW image data to the image processor 200 together with a horizontal/vertical synchronizing signal.

Figure 4:
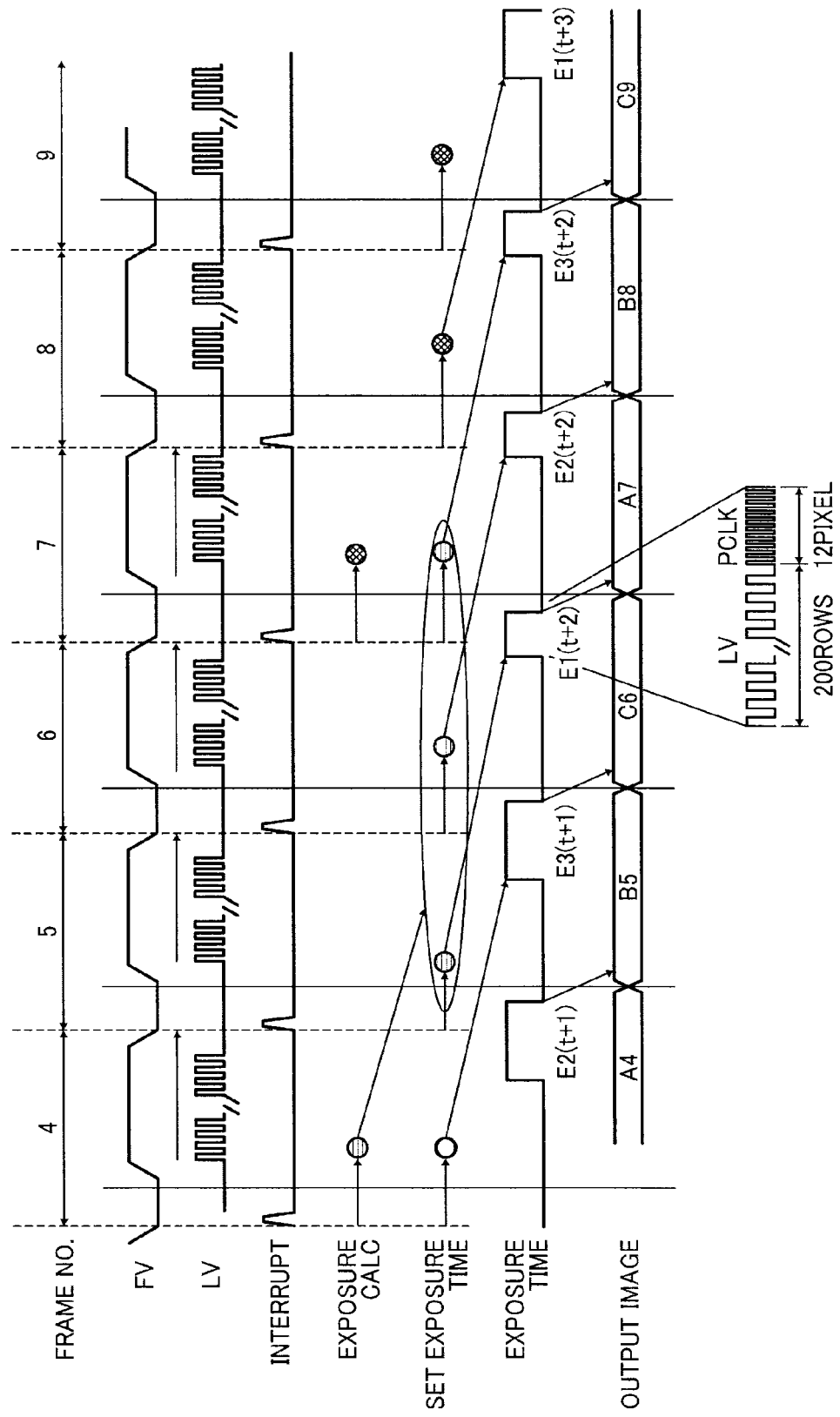
FIG. 4 is a timing chart showing an operation timing of an image sensor.

FIG. 4 is a timing chart showing an operation timing of the image sensor 102.

In FIG. 4, "Frame no." is a frame number for the sake of explanation and not an existing signal.

"FV (Frame Valid)" is a vertical synchronizing signal (vertical effective period signal).

"LV (Line Valid)" is a horizontal synchronizing signal (horizontal effective period signal).

"Interrupt" is generated when the vertical synchronizing signal FV starts down and a signal which is a base of interrupt processing entered in a CPU in an exposure controller 202.

"Exposure Calc" is an exposure time calculation periods for the sake of explanation and not an existing signal.

"Exposure time" is an exposure time, and specifically a charge accumulation rime of a photodiode forming the light receiving element 102a of the image sensor 102.

"Output Image" is polarization RAW image data produced from the image sensor 102.

A digital signal value (imaged pixel signal value) according to an amount of light received by the light receiving element 102a, which is produced from the image sensor 102 is sequentially produced one by one in time with a pixel synchronizing signal in synchronization with the vertical synchronizing signal separating one image from another in the image data and the horizontal synchronizing signal separating one horizontal line from another in the image data. The image processor 200 receives a signal value of an imaged pixel in accordance with these synchronizing signals produced from the image sensor 102 to properly obtain polarization RAW image data.

Figure 5:
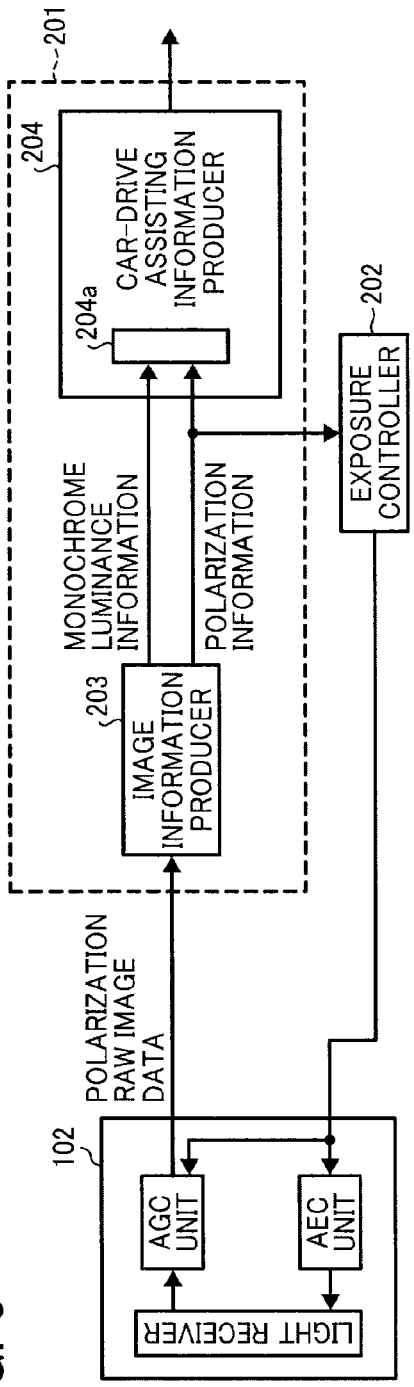
FIG. 5 is a block diagram showing an image processor.

FIG. 5 is a block diagram showing the image processor 200.

The image processor 200 mainly includes an image analyzer 201 and the exposure controller 202. The image analyzer 201 mainly includes an image information producer 203 and a car-drive assisting information producer 204.

The image information producer 203 of the image analyzer 201 calculates an index value representing a difference in size of the perpendicular polarization component and the horizontal polarization component of an image pixel from the polarization RAW image data, and produces the index value as polarization information. As the index value, a polarization ratio (S/P) of the perpendicular polarization component S to the horizontal polarization component P, and a difference polarization [(P−S)/(P+S)] which is a ratio of a difference value between the perpendicular polarization component S and the horizontal polarization component P to a sum thereof can be used.

When the horizontal polarization component P is small (P≈0), the polarization ratio is close to ∞ which is not a proper value. When a sum of the horizontal polarization component P and the perpendicular polarization component S is small (P+S≈0), the polarization ratio is close to ∞ which is not a proper value. Compared the polarization ratio with the difference polarization, the latter is preferably used because of having less impossibility to obtain a proper value than the former. However, the polarization ratio has a proper value when S is small (S≈0). In the present invention, a case where the difference polarization is used as an index value (polarization information) is explained.

Figure 6:
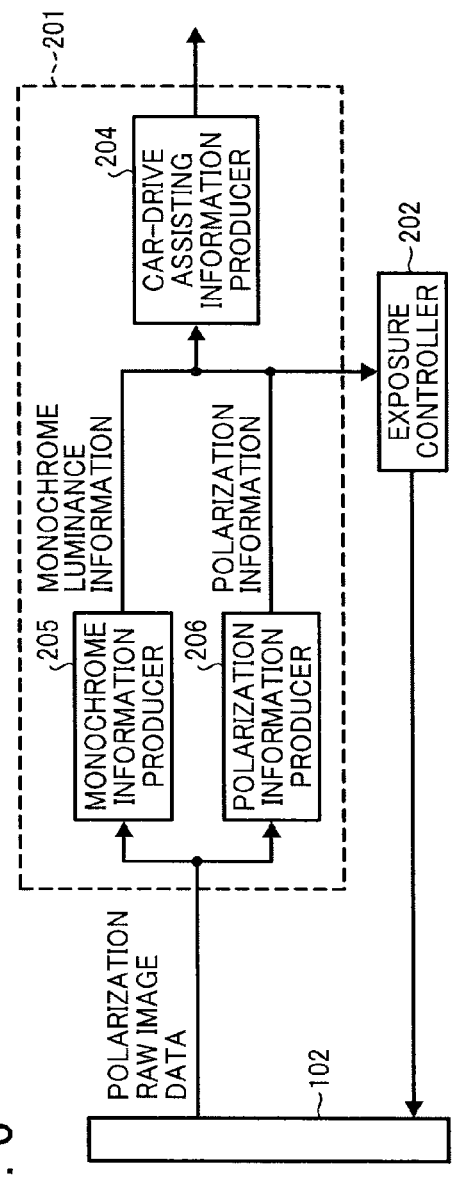
FIG. 6 is a block diagram showing another image processor.

The image information producer 203 further produces other data used for the car-drive assisting information producer 204 mentioned later besides the difference polarization, e.g., the image information producer 203 produces monochrome luminance information according to an amount of light received from each point in an imaging area. The monochrome luminance information can be used as a substitute of the sum (P+S) of the horizontal polarization component P and the perpendicular polarization component S. In the present invention, as FIG. 5 shows, the image information producer 203 produces both of the polarization information (difference polarization) and the monochrome luminance information. As FIG. 6 shows, a monochrome information producer 205 producing the monochrome luminance information and a polarization information producer 206 producing the polarization information (difference polarization) may separately and parallely produce these information.

The car-drive assisting information producer 204 of the image analyzer 201 holds a difference polarization of an image pixel produced from the image information producer 203 in a frame memory 204a once, and produces image data of a polarization information image having a pixel value of the image pixel, based on the difference polarization. The difference polarization has a distribution of from a negative value to a positive value, e.g., an effective range having a center of zero is standardized to an image pixel value (e.g., 0 to 255) to determine the standardized value as a pixel value. As for the monochrome luminance information of an image pixel produced from the image information producer 203, an effective range thereof may be standardized to an image pixel value (e.g., 0 to 255) to determine the standardized value as a pixel value.

The car-drive assisting information producer 204 uses the difference polarization image data and the luminance image data to produce car-drive assisting information, i.e., positional information of various objects, e.g., obstacles present around the vehicle, other vehicles, traffic lanes such as white lines and Botts Dots, road surface compositions such as manhole covers, road edge structures such as guard rails; road surface wet-dry information; and sunlight information informing sunny or shady, etc. The produced car-drive assisting information is transmitted to the display 300 to provide to a driver.

The exposure controller 202 of the image processor 200 determines an exposure (exposure time and gain) in the following imaging operation, based on the difference polarization (polarization information) produced by the image information producer 203 of the image analyzer 201 and changes a configuration of the image sensor 102. The gain corresponds to a gain of a signal representing an amount of light received by the light receiving element of the image sensor 102.

Figure 7:
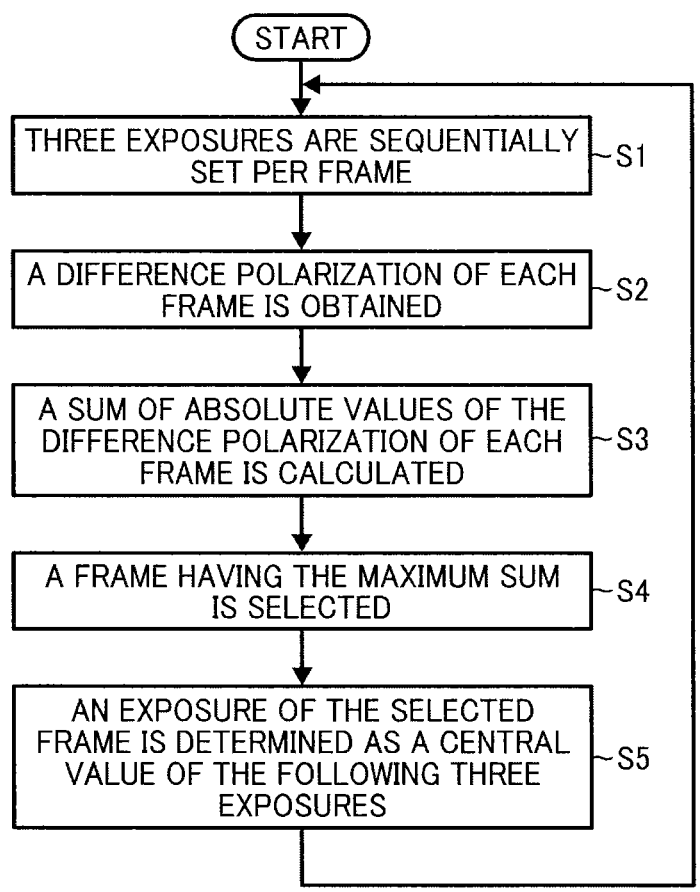
FIG. 7 is a flowchart showing a process of determining exposure by an exposure controller.

FIG. 7 is a flowchart showing a process of determining exposure by the exposure controller 202.

First, the exposure controller 202 sequentially sets plural exposures (exposure time and gain) different from each other per one frame (image) for the image sensor 102 (S1). Three exposures E1 ($t$), E2 ($t$) and E3 ($t$) are sequentially set here. When the image sensor 102 is driven at 60 FPS, an image having each of the exposures can be displayed as a moving image of 20 FPS. E1 ($t$), E2 ($t$) and E3 ($t$) satisfy a relationship of E1 ($t$)<E2 ($t$)<E3 ($t$).

Polarization RAW image data in which light received at each of the exposures are sequentially produced from the image sensor 102 for which the exposures are sequentially set, and entered in the image information producer 203 of the image analyzer 201. The exposure controller 202 obtains difference polarizations of the three exposure frames produced by the image information producer 203 (S2). The exposure controller 202 calculates total amounts of absolute values of difference polarizations of all the frames for each frame σ1 ($t$), σ2 ($t$) and σ3 ($t$) (S3). The exposure controller 202 selects the frame having a maximum total amount of absolute value of difference polarization σ1 ($t$), σ2 ($t$) and σ3 ($t$) from the three frames having different exposures. Then, the exposure controller 202 determines the exposure of the selected frame or a calculated result from assigning the exposure to a predetermined formula as a central value E2 ($t$+2) of the following three exposures (S5).

The exposure time is specifically set as follows.

The exposure controller 202 produces the vertical synchronizing signal FV, the horizontal synchronizing signal LV and the interrupt signal (Interrupt), and further performs an interrupt process, designating the interrupt signal as a starting point to calculate the following three exposure times. The calculated exposure times are provided to the image sensor 102. A control signal of the exposure time provided to the image sensor 102 is not a signal directly representing an exposure period, but a signal representing the numbers of the horizontal synchronizing signal LV and a pixel synchronizing signal PCLK. Therefore, the set value of the exposure time is made by the image sensor 102 having received the control signal.

Referring to FIG. 4, polarization RAW image data A1, B2 and C3 (unillustrated) correspondent to frames Nos. 1 to 3 (unillustrated) are imaged at the exposure times E1 ($t$), E2 ($t$) and E3 ($t$) based on previously memorized values. Then, receiving an interrupt signal designating a start down timing of the vertical synchronizing signal FV of a frame No. 4 as a starting point, three exposure times E1 ($t$+2), E2 ($t$+2) and E3 ($t$+2) set by frames Nos. 5 to 7 are calculated, based on the polarization RAW image data A1, B2 and C3. The exposure time set values set by the frames Nos. 5 to 7 are used as exposure times when imaging in the following frames Nos. 6 to 8, respectively. Polarization RAW image data images imaged at the three exposure times E1 ($t$+2), E2 ($t$+2) and E3 ($t$+2) are obtained as polarization RAW image data A7, B8 and C9 correspondent to frames Nos. 7 to 9. Exposure times E1 ($t$+1), E2 ($t$+1) and E3 ($t$+1) when imaging polarization RAW image data A4, B5 and C6 correspondent to frames Nos. 4 to 6 are the same the exposure times E1 ($t$), E2 ($t$) and E3 ($t$) in the timing of frames Nos. 2 to 4.

Namely, in the interrupt process when the frame No. satisfies 3n+1 (n≥1), the exposure times during three frames starting from 3n+2 which is one frame later are calculated. The exposure times are used when imaging in three frames starting from 3n+3, i.e., for obtaining polarization RAW image data correspondent to three frames starting from 3n+4. Further, in the interrupt process when the frame No. satisfies 3n+1 (n≥1), the previously-calculated exposure time when imaging in the following frame 3n+2 is set as well. In the interrupt processes when the frame No. satisfies 3n+2 and 3n+3 (n≥1), only the previously-calculated exposure time when imaging in the following frame is set and the exposure time is not calculated.

Control signals of the three exposure times E1 ($t$+2), E2 ($t$+2) and E3 ($t$+2) are sequentially transmitted to the image sensor 102, and which sets the exposure times according to the control signals. Specifically, the set value of the exposure time is entered in an AEC (Automatic Exposure Control) of the image sensor 102, and which determines a charge accumulation time of a photodiode forming the light receiving element 102$a$ of the image sensor 102. The image sensor 102 first resets the charge accumulation time of the photodiode forming the light receiving element 102$a$ to zero when starting exposure operation. When the determined charge accumulation time passes, a charge accumulated in the photodiode in the charge accumulation time is detected by a charge detector. The charge detector produces a voltage signal correspondent to the detected charge as a signal value of an imaging pixel. The exposure controller 202 produces a control signal relating to a set value of the gain as well, and which is entered in an AGC (Automatic Gain Control) unit of the image sensor 102 to perform an imaging operation by the gain.

In the present invention, a frame (difference polarization image) having a maximum difference of difference polarization (a difference in size of the horizontal polarization component and the perpendicular polarization component) correspondent to an image pixel is selected under the condition that total an amount of absolute values of the difference polarizations is maximum. This means $\Sigma |P (m, n)|$ is maximum when m is a horizontal polarization component value, n is a perpendicular polarization component value and P (m, n) are their difference polarizations. Further, the condition may be that a square root of a square sum of the difference polarizations, i.e., $[\Sigma(P (m, n)^2)]^{0.5}$ is maximum.

In the present invention, imaging operation of the difference polarization image are continuously performed while repeating the processes. The car-drive assisting information producer 204 only uses the difference polarization of the central value E2 ($t$) among the three exposures E1 ($t$), E2 ($t$) and E3 ($t$) to produce image data of the difference polarization image. Thus, the car-drive assisting information producer 204 produces a difference polarization image having a large total amount of absolute value of the difference polarizations, i.e., a difference polarization image having a large difference in size of the horizontal polarization component and the perpendicular polarization component as car-drive assisting information.

A difference polarization having one or both of the perpendicular polarization component and the horizontal polarization component of nearly zero, or saturated value of an amount of light received may be excluded from the total amount to determine the above-mentioned conditions of selecting a frame having a maximum difference in size of the horizontal polarization component and the perpendicular polarization component. This is because such difference polarizations do not accurately reflect the differences in size of the perpendicular polarization component and the horizontal polarization component.

Specifically, when the actual perpendicular polarization component is 600 and the horizontal polarization component is 200, the difference polarization is (200−600)/(200+600)=−0.5. The polarization ratio is 600/200=3. However, when the image sensor 102 has a light receiving element capable of detecting only an amount of light received equivalent to 0 to 255, the detected perpendicular polarization component is 255 and the horizontal polarization component is 200. In this case, the difference polarization is (200−255)/(200+255)≈−0.12 and the polarization ratio is 255/200=1.275. Therefore, the difference polarization and the polarization ratio are different from those of the actual perpendicular polarization component and the horizontal polarization component, and they are inaccurate. The inaccurate difference polarization and the polarization ratio cause a mistake in determining an optimum exposure.

When the actual perpendicular polarization component is 0.5 (nearly zero) and the horizontal polarization component is 200, the difference polarization is (200−0.5)/(200+0.5)=−0.995. The polarization ratio is 0.5/200=0.0025. When the actual perpendicular polarization component is 1.0 (nearly zero) and the horizontal polarization component is 200, the difference polarization is (200−1.0)/(200+1.0)=−0.990. The polarization ratio is 1.0/200=0.005. When one of the polarization components (the perpendicular polarization component here) is nearly zero, the difference polarization is so low that the difference polarization scarcely influences on determining the optimum exposure. The polarization component nearly zero is largely affected by a noise and the value of itself has low reliability, the resultant difference polarization is preferably excluded from the total amount. When both of the polarization components are nearly zero, the resultant difference polarization is preferably excluded from the total amount, as a matter of course.

A difference polarization having one or both of the perpendicular polarization component and the horizontal polarization component of nearly zero, or saturated value of an amount of light received is out of the actual value and inaccurate in many cases. When the image information producer 203 of the image analyzer 201 produces image data of a polarization information image, it is preferable to see an image pixel based on the difference polarization being ineffective and not to use the difference polarization when producing as car-drive assisting information. Thus, the car-drive assisting information produced from the difference polarization from which the inaccurate difference polarization is excluded improves in accuracy.

Modified Embodiment

Hereinafter, a modified embodiment of the exposure controller 202 is explained.

Figure 8:
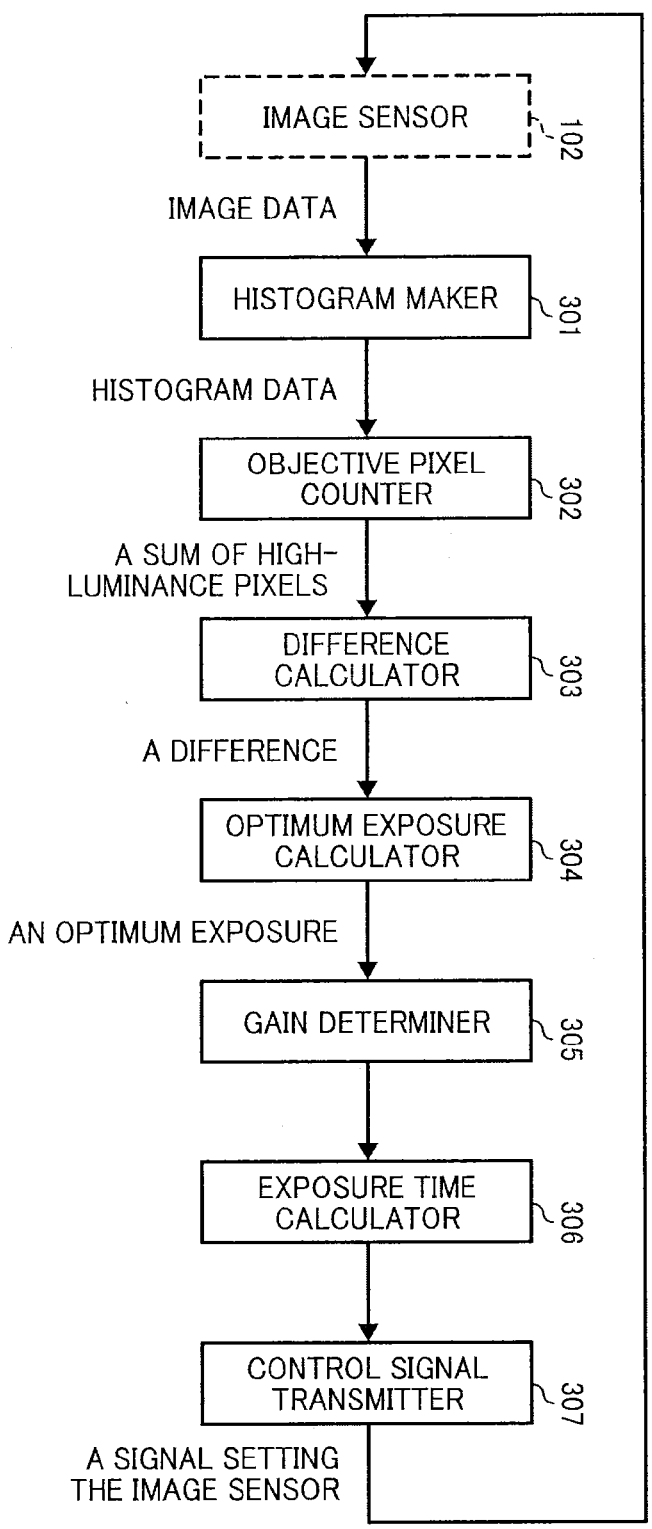
FIG. 8 is a control block diagram showing an exposure control by another exposure controller.

FIG. 8 is a control block diagram showing an exposure control by the modified embodiment of the exposure controller 202.

FIG. 9 is a flowchart showing a process of the exposure control thereby.

In this modified embodiment, the polarization RAW image data produced from the image sensor 102 is entered not only in the image analyzer 201 but also in the exposure controller 202. The exposure controller 202 makes a histogram of an amount of light received of all the light receiving elements (imaging pixel) on the image sensor 102 with a histogram maker 301, based on the polarization RAW image data (S21). Specifically, the histogram maker 301 counts the number of imaging pixels belonging to each of ranges divided in a predetermined number of amounts of light received. An imaging image may be divided into plural image areas to make a histogram of each of the image areas.

An objective pixel counter 302, a difference calculator 303, an optimum exposure calculator 304, a gain determiner 305, an exposure time calculator 306 and a control signal transmitter 307 are for bringing the number of high-intensity imaging pixels close to the target number of pixels. In this modified embodiment, the image sensor 102 produces data of an amount of light received, formed of 8 bit data in a range of 0 to 255 for each of the light receiving elements (imaging pixels). The data value of a saturated amount of light received is 255. In this modified embodiment, the number of high-intensity imaging pixels having data of an amount of light received close to 255 is controlled to not greater than the target number of pixels of from 0 to a few to lessen frequency of detecting the data of a saturated amount of light received.

Receiving the histogram data from the histogram maker 301, the objective pixel counter 302 counts a total amount $N_{brightness}$ of the number of high-intensity imaging pixels (S22). Whether it is a high-intensity imaging pixel depends on whether it is an imaging pixel having data of an amount of light received greater than a predetermined threshold, e.g., 230. The difference calculator 303 calculates a difference value Error between the total amount $N_{brightness}$ of the number of high-intensity imaging pixels and the predetermined target number of pixels $N_{target}$ (S23).

The optimum exposure calculator 304 performs the following process such that the total amount $N_{brightness}$ of the number of high-intensity imaging pixels comes close to the predetermined target number of pixels $N_{target}$. Namely, from the difference value Error between the total amount $N_{brightness}$ of the number of high-intensity imaging pixels and the target number of pixels $N_{target}$, an optimum exposure variation updata is calculated using PID control method (S24). Specifically, the optimum exposure variation updata is calculated by the following formula (1).

$$\text{Updata}=Kp_{hist}\times(\text{error}-\text{error}_1)+Kp_{hist}\times\text{error}+Kd_{hist}\times(\text{error}-\text{error}_1)-(\text{error}_1-\text{error}_2) \quad (1)$$

In the formula (1), "$\text{error}_1$" is a difference value between the total amount $N_{brightness}$ of the number of high-intensity imaging pixels and the target number of pixels $N_{target}$ in the previous frame and "$\text{error}_2$" is a difference value between the total amount $N_{brightness}$ of the number of high-intensity imaging pixels and the target number of pixels $N_{target}$ in the frame before the previous frame. "$Kp_{hist}$", "$Kp_{hist}$" and "$Kd_{hist}$" are PID control coefficients. The PID control coefficients are set by various experiments, etc. when necessary, and the modified embodiment includes regulated coefficients.

The gain determiner 305 calculates an optimum exposure from the optimum exposure variation updata produced by the optimum exposure calculator 304 (S25), and determines the gain according to a size of the optimum exposure (S26). Specifically, the gain determiner 305 previously holds data of a maximum exposure $\text{exposure}_{max}$ obtainable by the image sensor 102 for a maximum exposure time. The $\text{exposure}_{max}$ in this modified embodiment is determined by the following formula (2). $N_{column}=845$ and $N_{row}=525$ therein.

$$\text{exposure}_{max}=N_{column}\times N_{row} \quad (2)$$

When the optimum exposure determined from the optimum exposure variation updata is over the maximum exposure $\text{exposure}_{max}$, the gain determiner 305 increases the gain to adjust the exposure so as to obtain the optimum exposure. Specifically, when the optimum exposure is not greater than the maximum exposure $\text{exposure}_{max}$, the gain is set single. When the optimum exposure is greater than the maximum exposure $\text{exposure}_{max}$ and not less than double thereof, the gain is set double. When the optimum exposure is greater than double of the maximum exposure $\text{exposure}_{max}$ and not less than three times thereof, the gain is set three times. When the optimum exposure is greater than three times of the maximum exposure $\text{exposure}_{max}$ and not less than four times thereof, the gain is set four times. Similarly, when the optimum exposure is greater than (n−1) times of the maximum exposure $\text{exposure}_{max}$ and not less than n times thereof, the gain is set n times.

The gain determiner 305 calculates an exposure without gain $\text{exposure}_{withoutgain}$ which is a balance after the gain adjustment is removed from the optimum exposure to be transmitted to the exposure time calculator 306, based on the following formula (3) (S27).

$$\text{exposure}_{withoutgain}=\text{exposure}-(\text{gain}-1)\times\text{exposure}_{max}$$

wherein "gain" is a set gain (multiple value).

The exposure time calculator 306 calculates exposure times by the following formulae (4) and (5), based on exposure without gain exposure exposure$_{withoutgain}$ from the gain determiner 305. "rowexposure" is an exposure time correspondent to an output time of one row of image data (a time equivalent to a combined period of one H level period and one L level period in a horizontal synchronizing signal) and "pixelexposure" is an exposure time correspondent to an output time of one pixel of image data (a time equivalent to a combined period of one H level period and one L level period in a pixel synchronizing signal). As FIG. 4 shows, the image sensor 102 operates with reference to the perpendicular synchronizing signal, the horizontal synchronizing signal and the pixel synchronizing signal, and the exposure time calculator 306 calculates the numbers of the horizontal synchronizing signal and the pixel synchronizing signal as exposure times from the following formulae (4) and (5).

$$\text{rowexposure} = \text{exposure}_{withoutgain} N_{column} \quad (4)$$

$$\text{pixelexposure} = \text{exposure}_{withoutgain} - \text{rowexposure} \times N_{row} \quad (5)$$

The control signal transmitter 307 transmits a control signal for setting the gain and the exposure times determined by the gain determiner 305 and the exposure time calculator 306 to the image sensor 102. Thus, the gain and the exposure times of the image sensor are set.

In the present invention, not only the polarization information image such as the difference polarization image, but also a monochrome luminance image based on monochrome luminance information is obtained, and an image analyzing process the polarization information image excels at and another image analyzing process the monochrome luminance image excels at are separately performed and the accuracy of the image analyzing process is improved.

Specifically, when imaging an imaging area, differences of weather, or sunny or shady therein differentiate a contrast of the monochrome luminance image or the polarization information image. When detecting the car-drive assisting information such as road surface information, information of other vehicles, road edge information, road surface wet-dry information, information of road surface compositions such as manhole covers, information of traffic lanes such as white lines and Botts Dots, and sunlight information, the monochrome luminance image and the polarization information image are respectively good at or not good at detecting these information. The information the monochrome luminance image is not good at detecting is the information the polarization information image is good at detecting, or the information the polarization information image is not good at detecting is the information the monochrome luminance image is good at detecting. Thus, the monochrome luminance image and the polarization information image complement each other. The present invention takes advantage of this complementary relationship between the monochrome luminance image and the polarization information image to improve detection accuracy of various information with a simple composition regardless of the imaging environment.

In order to obtain the monochrome luminance image suitable for detecting the car-drive assisting information such as road surface information, information of other vehicles, road edge information, road surface wet-dry information, information of road surface compositions, traffic lane information and sunlight information, exposure control of the monochrome luminance image is preferably performed besides the exposure adjustment of the polarization information image having been explained. The exposure adjustment of the monochrome luminance image typically includes the followings. The exposure is controlled such that an average luminance of the monochrome luminance image falls in a predetermined range. The pixels are grouped by brightness, e.g., bright pixel, slightly bright pixel, dark pixel and slightly dark pixel; a range of the number of pixels belonging to each of the group is previously determined; and the exposure is controlled to fall in the range. In the present invention, whichever method or other methods may be used. In the present invention, when the exposure control of the monochrome luminance image is performed besides the exposure adjustment of the polarization information image, imaging for four times at different exposures to adjust exposure of the difference polarization image, three of the imaging are used to adjust exposure of the difference polarization image, and one thereof is used to adjust exposure of the monochrome luminance image. Then, each of the imaging is performed at 15 FPS when the image sensor is driven at 60 FPS.

The present invention includes the following embodiments exerting their respective effects, besides the above-mentioned embodiments.

Embodiment A

An imaging apparatus including an imaging device 100 calculating index values such as a polarization ratio and a difference polarization representing differences in sizes of plural polarization components such as a horizontal polarization component P and a perpendicular polarization component S having polarization directions different from each other included in light from each point in an imaging area; and continuously imaging a polarization information image such as a polarization ratio image and a difference polarization image having a pixel value based on each of the calculated index values to obtain a moving image of the polarization information image, which is characterized by having an exposure adjuster such as an exposure controller 202 controlling the exposure such that the differences in sizes of the plural polarization components are maximum while the imaging apparatus is continuously imaging.

This can obtain a polarization information image based on an accurate index value showing more largely the differences in sizes of the plural polarization components. Consequently, a polarization information image having higher contrast can be imaged and the polarization information image can accurately be analyzed.

Embodiment B

In the embodiment A, the imaging device receives light from an object present in the imaging area through an optical filter with an image sensor 102 formed of a pixel array where a light receiving element 102a is two-dimensionally located, and the optical filter is characterized by including a polarization filter 103 in which a first area such as a perpendicular polarization area transmitting only a selected polarization component in a specific direction (perpendicular polarization component) and a second area transmitting light without selecting a polarization component or only a selected polarization component in a direction different from the specific direction (horizontal polarization component) are distributed in a two-dimensional direction of one or more of the light receiving elements located on the image sensor 102.

This can obtain both of an image based on light transmitting through the first area (perpendicular polarization image) and an image based on light transmitting through the second area (horizontal polarization image) at one imaging, and an image having higher frame rate (moving image) can be obtained.

Embodiment C

In embodiment A or B, it is characterized that the exposure controller makes the imaging device continuously or once image at the predetermined time of adjusting exposure, obtains plural polarization information images having different exposures from each other, selects a specific polarization information image in which plural polarization components have maximum differences in sizes from the plural polarization information images, determines an exposure of the following imaging operation, based on an exposure correspondent to the selected specific polarization information image.

This can adjust the exposure to obtain a polarization information image showing more largely the differences in sizes of the plural polarization components even while imaging operations are continuously performed to obtain a moving image.

A case where three polarization information images having different exposures are imaged by continuously imaging three times is mentioned above, and three polarization information images can be imaged at one time imaging. In this case, shade surfaces (diaphragm) having different areas and shading a part of the area are formed in the respective first and second areas of the polarization filter 103 such that the first and second areas are divided into three areas having different light transmissions each other. These shade surfaces may be formed in the light receiving area of the light receiving element of the image sensor 102.

Embodiment D

In the embodiment C, it is characterized that the exposure controller calculates a total amount of absolute values or a square root of a square sum of the index values of the plural polarization information images to selects a polarization information image having a maximum result as the specific polarization information image.

This can select a specific polarization information image having a maximum difference among plural polarization components by a simple calculation.

Embodiment E

In the embodiment D, it is characterized that the exposure controller does not use an index value calculated using a polarization component having an amount of light received not greater than a minimum threshold close zero for the above-mentioned calculation.

This reduces exposure adjustment based on an inaccurate index value based on a polarization component largely influenced by a noise, and enables exposure adjustment having higher reliability.

Embodiment F

In the embodiment D or E, it is characterized that the exposure controller does not use an index value calculated using a polarization component having an amount of light received not less than a maximum threshold, e.g., 230 for the above-mentioned calculation.

This reduces exposure adjustment based on an inaccurate index value based on a polarization component having a value close to a saturated value, and enables exposure adjustment having higher reliability.

Embodiment G

In any one of the embodiments C to F, it is characterized that the exposure controller continuously performs plural imaging operations while increasing or decreasing the exposure in stages and determines an exposure correspondent to the selected specific polarization information image as a central value of exposures used in the following plural imaging operations.

This can adjust the exposure by comparatively a simple control.

Embodiment H

In any one of the embodiments A to G, it is characterized that the exposure controller adjusts the exposure such that the number of the light receiving elements receiving light in an amount greater than a predetermined threshold are not greater than a specified number.

As explained in the above-mentioned modified embodiment, this prevents a polarization information image from being produced based on an inaccurate index value based on a polarization component showing an amount of light received is close to a saturated value, a polarization information image having more accuracy can be obtained, and the polarization information image can be more accurately analyzed.

Embodiment I

An image analyzer having a detector detecting an object present in an imaging area, based on an image imaged by an imaging apparatus, which is characterized by using the imaging apparatus in any one of the embodiments A to H as the imaging device.

A polarization information image based on an accurate index value showing more largely the differences in sizes of the plural polarization components can be more accurately analyzed.

Embodiment J

A moving apparatus such as a car equipped with an imaging device imaging around the moving apparatus, which is characterized by using the imaging apparatus in any one of the embodiments A to H.

The moving apparatus can see around itself through a polarization information image based on an accurate index value showing more largely the differences in sizes of the plural polarization components.

Having now fully described the invention, it will be apparent to one of ordinary skill in the art that many changes and modifications can be made thereto without departing from the spirit and scope of the invention as set forth therein.

What is claimed is:
1. An imaging apparatus, comprising:
   an imaging device configured to determine an index value representing differences in sizes of plural polarization components having polarization directions different from each other included in light from each point in an imaging area, and continuously image a polarization information image having a pixel value based on the determined index value to form a moving image of the polarization information image; and a light exposure adjuster configured to adjust a light exposure such that the differences in sizes of the plural polarization components are maximum at a predetermined light exposure adjustment time during the continuous imaging, wherein the index value corresponds to a difference polarization that is a ratio of a difference value between the plural polarization components to a sum of the plural polarization components.

2. The imaging apparatus of claim 1, wherein the imaging device receives light from an object present in the imaging area through an optical filter with an image sensor formed of a pixel array where a light receiving element is two-dimensionally located, wherein the optical filter comprises a polarization filter in which a first area transmitting only a selected polarization component in a specific direction and a second area transmitting light without selecting a polarization component or only a selected polarization component in a direction different from the specific direction, are distributed in a two-dimensional direction of one or more of the light receiving elements located on the image sensor.

3. The imaging apparatus of claim 1, wherein the light exposure adjuster makes the imaging device continuously or once image at the predetermined time of adjusting exposure, obtains plural polarization information images having different exposures from each other, selects a specific polarization information image in which the plural polarization components have maximum differences in sizes from the plural polarization information images, and determines an exposure of the following imaging operation, based on an exposure correspondent to the selected specific polarization information image.

4. The imaging apparatus of claim 3, wherein the light exposure adjuster calculates a total amount of absolute values or a square root of a square sum of the index values of the plural polarization information images to select a polarization information image having a maximum result as the specific polarization information image.

5. The imaging apparatus of claim 4, wherein the light exposure adjuster does not use an index value calculated using a polarization component having an amount of light received not greater than a minimum threshold close to zero for the calculation.

6. The imaging apparatus of claim 4, wherein the light exposure adjuster does not use an index value calculated using a polarization component having an amount of light received not less than a maximum threshold for the calculation.

7. The imaging apparatus of claim 1, wherein the light exposure adjuster continuously performs plural imaging operations while increasing or decreasing the exposure in stages and determines an exposure correspondent to the selected specific polarization information image as a central value of exposures used in following plural imaging operations.

8. The imaging apparatus of claim 1, wherein the light exposure adjuster adjusts the exposure such that a number of light receiving elements receiving light in an amount greater than a predetermined threshold are not greater than a specified number.

9. An image analyzer comprising a detector detecting an object present in the imaging area, based on the image imaged by the imaging apparatus according to claim 1.

10. A moving apparatus comprising an imaging apparatus imaging around the moving apparatus, wherein the imaging apparatus is the imaging apparatus according to claim 1.

* * * * *